United States Patent [19]
Gandhi et al.

[11] Patent Number: 5,708,511
[45] Date of Patent: Jan. 13, 1998

[54] METHOD FOR ADAPTIVELY COMPRESSING RESIDUAL DIGITAL IMAGE DATA IN A DPCM COMPRESSION SYSTEM

[75] Inventors: Bhavan R. Gandhi, Pittsford, N.Y.; Craig Michael Smith, Tokyo, Japan; James R. Sullivan, Spencerport, N.Y.; Douglas W. Couwenhoven, Fairport, N.Y.; Gregory Rombola, Spencerport, N.Y.

[73] Assignee: Eastman Kodak Company, Rochester, N.Y.

[21] Appl. No.: 734,551

[22] Filed: Oct. 17, 1996

Related U.S. Application Data

[63] Continuation of Ser. No. 410,462, Mar. 24, 1995.
[51] Int. Cl.$^6$ ............................................. H04N 1/415
[52] U.S. Cl. ................................. 358/426; 358/433
[58] Field of Search ............................ 358/426–427, 358/261.1–261.4, 262.1, 432–433; 382/232, 238, 244

[56] References Cited

U.S. PATENT DOCUMENTS

| | | | |
|---|---|---|---|
| 3,745,562 | 7/1973 | Rosenbaum | 340/347 |
| 4,538,234 | 8/1985 | Honda et al. | 364/513.5 |
| 4,885,636 | 12/1989 | Sullivan | 358/133 |
| 4,910,594 | 3/1990 | Kondo | 358/138 |
| 4,974,235 | 11/1990 | Sasaki et al. | 375/27 |
| 5,051,840 | 9/1991 | Watanabe et al. | 358/433 |
| 5,235,418 | 8/1993 | Lucas | 358/133 |
| 5,237,410 | 8/1993 | Inoue | 358/136 |
| 5,268,961 | 12/1993 | Ng | 380/19 |
| 5,287,200 | 2/1994 | Sullivan et al. | 358/433 |

*Primary Examiner*—Edward L. Coles, Sr.
*Assistant Examiner*—Stephen Brinich
*Attorney, Agent, or Firm*—Thomas H. Close

[57] ABSTRACT

A block adaptive differential pulse code modulation (DPCM) system includes both a lossless DPCM processor responsive to blocks of pixel values for producing encoder command signals and a lossy DPCM compressor responsive to blocks of pixel values for producing encoder command signals. An encoder receives the encoder command signals from the lossless DPCM processor and lossy DPCM compressor and produces a compressed encoded bit stream. A switch responsive to a compression configuration signal and to the encoder command signals from the lossy compressor selectively passes the encoder command signals from the lossless processor or the lossy compressor to the encoder.

23 Claims, 9 Drawing Sheets

METHOD FOR ADAPTIVELY COMPRESSING RESIDUAL DIGITAL IMAGE DATA IN A DPCM COMPRESSION SYSTEM

This is a Continuation of application Ser. No. 08/410,462, filed Mar. 24, 1995.

This invention was made with Government support under contract number FA7056-92-C-0020 awarded by the Department of Defense. The Government has certain rights in this invention.

The disclosure in the microfiche appendix contains material to which a claim of copyright protection is made. The copyright owner has no objection to the facsimile reproduction of any one of the patent documents or the patent disclosure as it appears in the U.S. Patent and Trademark Office patent file or records, but reserves all other rights whatsoever.

FIELD OF THE INVENTION

The invention relates generally to the field of digital image processing, and in particular to a method for adaptively compressing residual digital image data in a differential pulse code modulation (DPCM) system.

BACKGROUND OF THE INVENTION

A DPCM system for compressing a digital image signal generally includes a predictor, a quantizer, and an encoder. The predictor serves to transform the digital image signal into a residual signal space. The residual signal is simply the mathematical difference between the original pixel values in the digital image signal and corresponding predicted pixel values produced by the system.

A block adaptive quantization strategy was developed by Sullivan et al. for a prediction-based compression technique, see U.S. Pat. No. 4,885,636; issued Dec. 5, 1989 to J. R. Sullivan, and U.S. Pat. No. 5,287,200 issued Feb. 15, 1994 to J. R. Sullivan and C. M. Smith. The quantizer systems disclosed by Sullivan et al. include multiple quantizers which are arranged in a radial (circularly symmetric) configuration as shown in FIG. 10. A specific quantizer $Q_n$ is chosen from a set of quantizers 10 based on the local statistics $\mu_k, \sigma_k$ of an n×m blocked neighborhood 12 of residual data $\Delta_{ij}$, where the subscript k indicates the $k^{th}$ block of residual image data. The mean, $\mu_k$, and standard deviation, $\sigma_k$, are computed (14) for each block of data 10; these statistics index a quantizer $Q_n$ which is tuned to the local statistics for that blocked neighborhood. The statistics are computed as follows:

$$\mu_k = \frac{1}{nm} \sum_{i=0}^{(n-1)} \sum_{j=0}^{(m-1)} \Delta_{ij}, \text{ and} \quad (1)$$

$$\sigma_k = \left[ \frac{1}{nm} \sum_{i=0}^{n-1} \sum_{j=0}^{m-1} \Delta_{ij}^2 \right]^{1/2}$$

The residual signal, $\Delta_{ij}$, is the mathematical difference between the original image pixel, $x_{ij}$, value and its corresponding predicted value, $p_{ij}$.

$$\Delta_{ij} = x_{ij} - p_{ij} \quad (2)$$

Each of the individual quantizers may be designed using a Lloyd-Max quantization strategy.

So far the discussion has been limited to lossy compression techniques. A prediction based numerically lossless compression algorithm bypasses the quantization process and achieves compression by directly encoding the residual data. Encoding techniques such as Huffman and arithmetic coding can be used to losslessly encode the residual image data. These encoding techniques may also be used to encode the quantized residual image data. For achieving very low bit rates, Sullivan et al. disclose the technique of deciding whether a block of residual data is in a run of blocks having near zero residual values, and run-length encoding such blocks.

The radial, circularly symmetric partitioning of quantizer space in the DPCM encoding technique disclosed by Sullivan et al. limits the ability to tune the quantizer selection process independently for both the mean and standard deviation of the local blocks.

In the run-length encoding technique disclosed by Sullivan et al., error can accumulate during a run, causing a bias in the reconstructed digital image signal. This accumulated error can result in the premature termination of a run thereby decreasing the effectiveness of the compression technique.

It is the object of the present invention to overcome the shortcomings noted above and to further improve the prior art DPCM encoding technique.

SUMMARY OF THE INVENTION

The object is achieved according to the present invention by providing a block adaptive differential pulse code modulation (DPCM) system including a lossless DPCM processor responsive to blocks of pixel values for producing encoder command signals; a lossy DPCM compressor responsive to blocks of pixel values for producing encoder command signals; an encoder for receiving encoder command signals and producing a compressed encoded bit stream; and a switch responsive to a compression configuration signal and to the encoder command signals from the lossy compressor for selectively passing the encoder command signals from the lossless processor or the lossy compressor to the encoder.

The block adaptive differential pulse code modulation (DPCM) compression system according to the present invention is capable of achieving compression rates ranging from low bit rates (less than 1.0 bits per pixel) to numerically lossless compression.

According to a further aspect of the present invention, an improved adaptive quantizer employs an elliptically partitioned quantizer space which allow the quantizer selection to be tuned independently for both mean and standard deviation of the blocks. This allows for more efficient design of a quantizer space and the corresponding quantizers within the quantizer space.

According to another aspect of the present invention, the quantized residual data is subsampled during the quantization step in low activity image regions and the unsampled data is discarded to further increase compression. For image blocks that are classified as run blocks, the accumulated error is tracked and a bias is introduced to offset the error when the error exceeds a certain threshold. This results in a greater number of sequential blocks being classified as in a run, thereby increasing the compression of the data.

According to a still further aspect of the present invention, the digital image data and residual data may be multiplied by a scale factor prior to quantization. The scale factor governs the amplitude of the residual signal which ultimately results in controlling the compressibility of the data. This scale factor can be user specified to vary the compression rate. Additionally, the user can manually specify a desired processing configuration to select a particular processing path, lossy or lossless. Alternatively, the processing configuration is automatically selected by a rate controller as a function of the local compression rate. A suitable rate controller for controlling the compression rate is disclosed in copending U.S. patent application Ser. No. (EK Docket 69,676) entitled "Data Compression Rate Control Method and Apparatus" by Douglas W. Couwenhoven et al., filed on even date herewith. Both the user specification or automatic control of a processing configuration mode and a scale factor provide the means for rate controlling the processing system according to the needs of the user.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
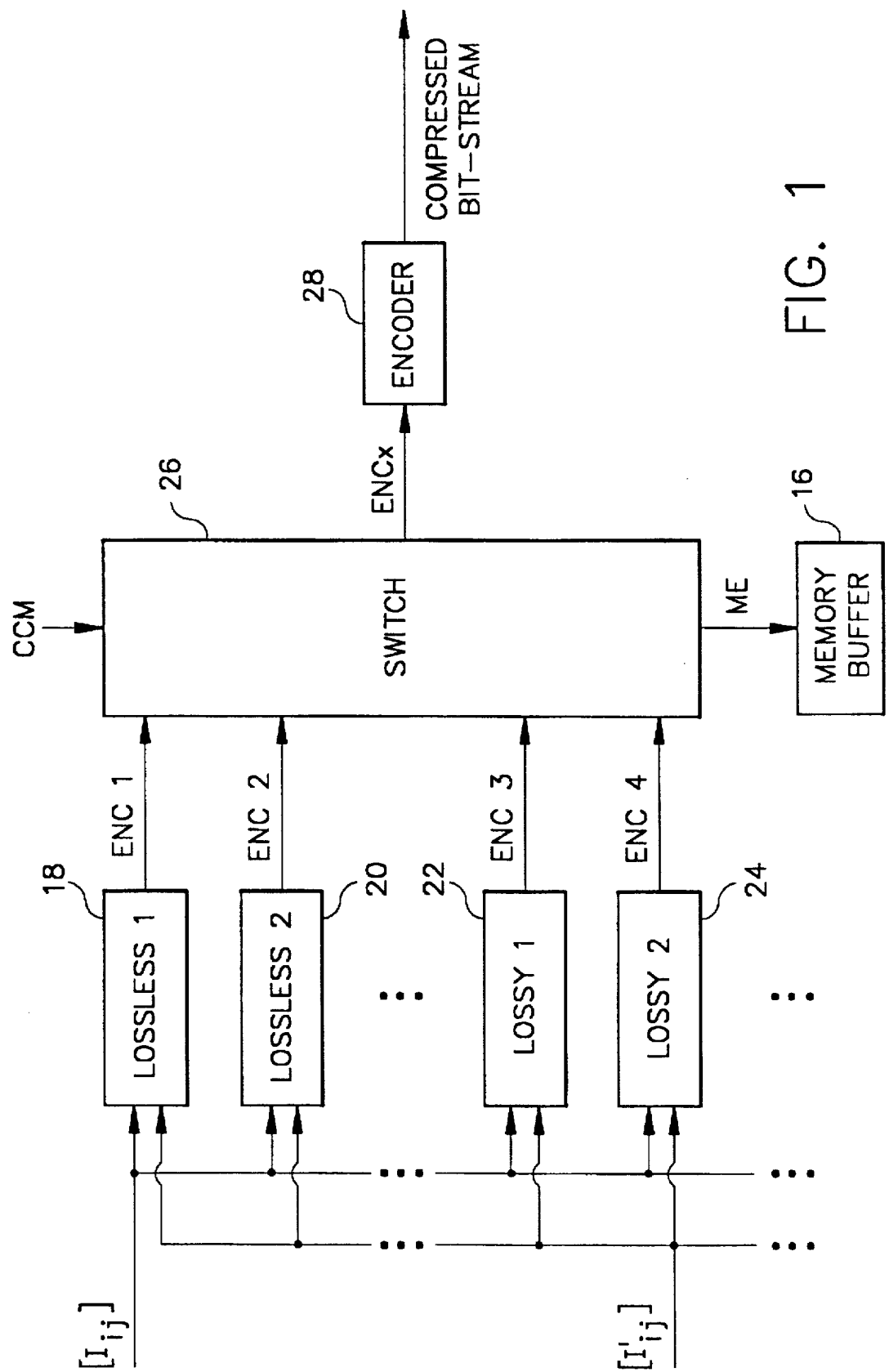
FIG. 1 is a block diagram showing a DPCM compression system having lossless and lossy compression paths according to the present invention.

The hardware block diagram shown in FIG. 1 gives an overview of the block adaptive differential pulse code modulation (DPCM) compressor according to the present invention. When blocks of data are discussed herein, the symbol for the data will be enclosed in square brackets "[ ]". Blocks of input image data $[I_{ij}]$ and previously reconstructed image data $\Gamma_{ij}$ which is stored in and read from a common memory buffer 16 are passed to a first lossless processor 18, a second lossless processor 20, a first lossy compressor 22, and a second lossy compressor 24. The lossless processors 18 and 20, and the lossy compressors 22 and 24, generate encoder command signals ENC1–ENC4 which are input to a switch 26. This switch 26 is responsive to a compression configuration mode signal CCM for selecting specific encoder command signals to be passed to the encoder. The switch 26 is further responsive to the contents of the encoder command signals for determining which specific encoder command signal gets passed to an encoder 28, thereby selectively overriding the configuration mode signal when necessary to maintain an upper bound on the quantization error resulting from a lossy compression. The encoder 28 receives the passed encoder command signal ENCx for encoding processed residual image data into a compressed bit stream. The switch 26 also generates a processor signal indicating the processing path presently being employed. This processor signal activates a memory buffer 16 for storing reconstructed image data from the presently employed processing path. The compressed bit stream produced by the compressor may be stored or transmitted as is well known in the art.

Figure 2A:
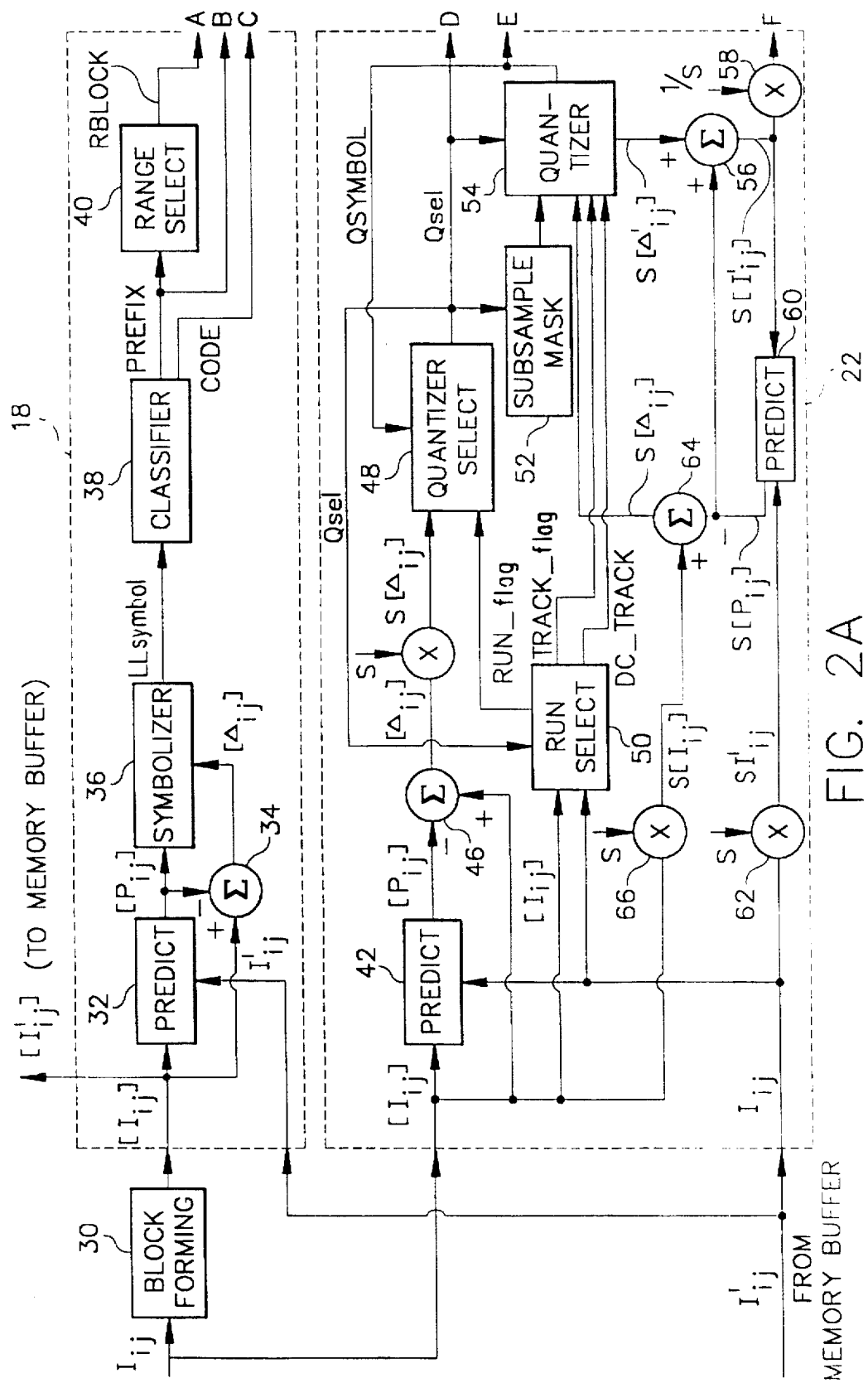
FIG. 2 is a detailed block diagram showing a preferred embodiment of the DPCM compression system shown in FIG. 1.
Figure 2B:
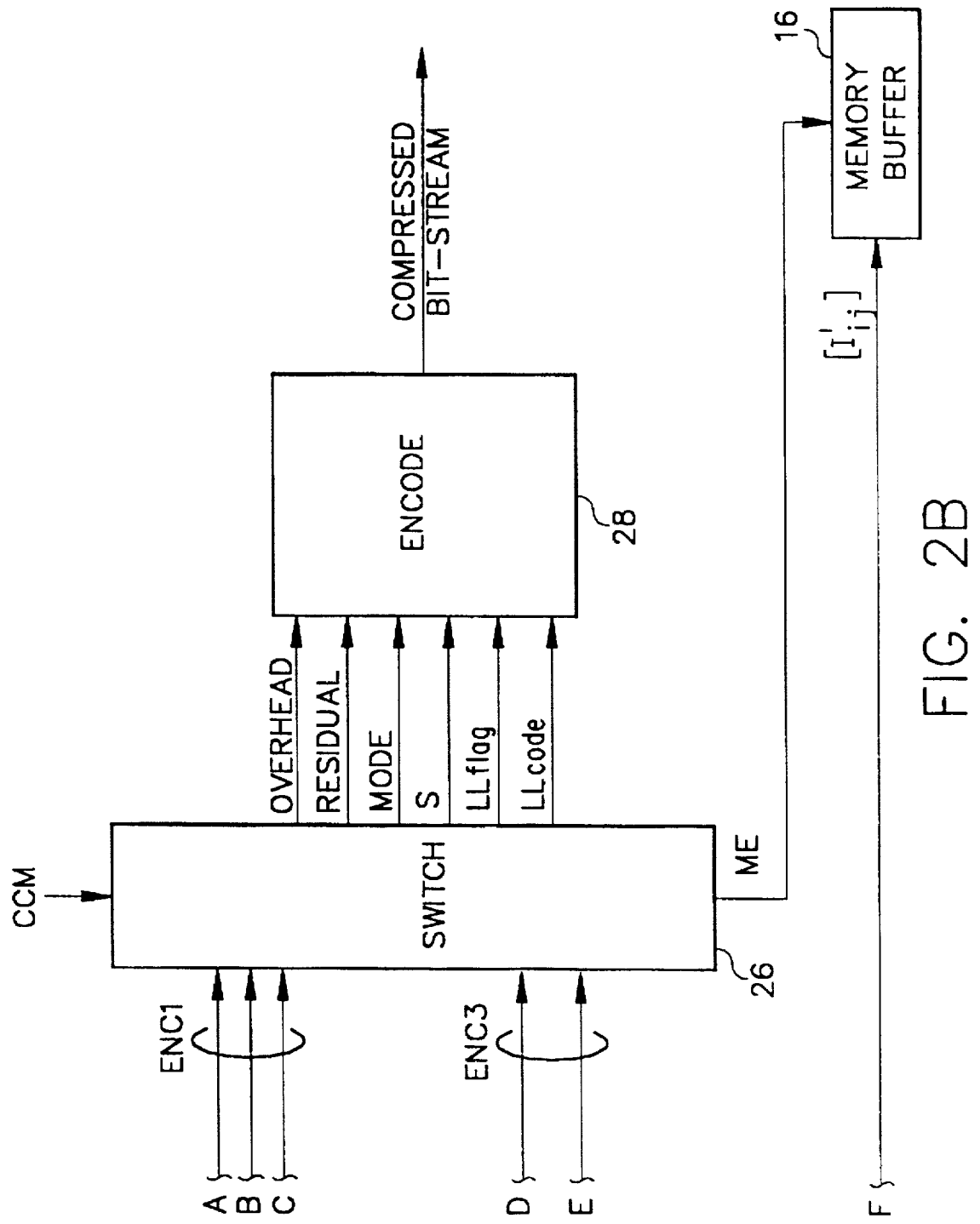

A more detailed block diagram of the workings of a block adaptive lossless processor and a block adaptive lossy compressor is provided in FIG. 2, where parts similar to those in FIG. 1 are similarly numbered. The input image pixel values $I_{ij}$ are formed into blocks $[I_{ij}]$ by block former 30. Block 18 in FIG. 2 is a more detailed block diagram of a lossless processor. In the lossless processor 18, blocks of pixel values $[I_{ij}]$, and reconstructed pixel values $\Gamma_{ij}$ are received and fed to a predictor 32 for generating a block of predicted pixel values $[p_{ij}]$. A suitable predictor is shown and described in U.S. patent application Ser. No. 08/333,664, filed Nov. 3, 1994, entitled "Digital Image Processor" by Bhavan R. Gandhi et al.

The original pixel values are marked for storage in memory buffer 16. Each predicted pixel value in the block $[p_{ij}]$, is subsequently subtracted from the corresponding original pixel value in the block $[I_{ij}]$, in a subtractor 34 to form difference pixel values, $[\Delta_{ij}]$. The predicted pixel values $[p_{ij}]$ and the corresponding difference pixel values $[\Delta_{ij}]$ are fed to a symbolizer 36 which generates a lossless symbol, LLsymbol, corresponding to the difference signal. In an eight-bit system, LLsymbol can take any value between 0 and 255. The lossless symbol, LLsymbol, is then fed to a classifier 38 which groups together symbols with similar probabilities. Classifier 38 identifies the group of which LLsymbol is a member and a symbol within the group. The group is represented by a prefix value, and a corresponding code value representing the symbol within the group. The first column of Table 1 lists the groups of LLsymbol values and the second column shows the corresponding prefix values for each group. The third column lists the number of bits in the code value. The code values are calculated by subtracting the minimum symbol value in the group from the actual symbol value.

TABLE 1

| Lossless Symbol Group | Prefix | # of Code Bits |
|---|---|---|
| 0 | 0 | 0 |
| 1–2 | 1 | 1 |
| 3–6 | 2 | 2 |
| 7–14 | 3 | 3 |
| 15–30 | 4 | 4 |
| 31–62 | 5 | 5 |
| 63–126 | 6 | 6 |
| 127–254 | 7 | 7 |
| 255 | 8 | 0 |

TABLE 2

| Maximum Prefix | Range Selection ($R_{block}$) |
| --- | --- |
| 0 | 0 |
| 1 | 1 |
| 2 | 1 |
| 3 | 2 |
| 4 | 2 |
| 5 | 3 |
| 6 | 4 |
| 7 | 4 |
| 8 | 4 |

The prefix and code values generated by the classifier 38 are fed to the switch 26. Finally, a range select module 40 responding to prefix values for each symbol in an N×M pixel block is used to generate the maximum prefix value in the N×M pixel block. This maximum prefix value for the block, denoted as $R_{block}$, is also fed to the switch 26. Table 2 lists the maximum prefix values and corresponding $R_{block}$ values. In the preferred embodiment, there are five $R_{block}$ values taking on values between zero and four. In summary, lossless processor 18 generates an $R_{block}$ value for an N×M block, and corresponding prefix and code values for each pixel within the N×M block, all of which are fed to the switch 26. These three values comprise the encoder command signals ENC1.

A more detailed block diagram of a lossy compressor 22 is also shown in FIG. 2. The lossy compressor 22 receives blocks of original image pixel values, [$I_{ij}$], previously reconstructed pixel values $\Gamma_{ij}$ and a scale factor S. Scale factor S can be user specified, or alternatively provided by a rate controller (not shown) that responds to a memory buffer level and rate of fill signal. The lossy compressor 22 produces a quantizer select signal $Q_{sel}$, quantized symbol data ($Q_{symbol}$), and blocks of reconstructed pixel data ([$\Gamma_{ij}$]). Original pixel values [$I_{ij}$] and previously reconstructed pixel values $\Gamma_{ij}$, are input to a predictor 42 which produces a predicted pixel value $p_{ij}$ (not necessarily the same as the predicted pixel value produced by predictor 32 described above) corresponding to the current original pixel value. The predicted pixel value is subsequently subtracted from the original pixel value by subtractor 44 to produce a difference pixel value $\Delta_{ij}$ (again, not necessarily the same as the difference pixel value produce by subtractor 34 described above) for each pixel in a N×M block of pixels. Each of the difference pixel values are multiplied a scale factor S by multiplier 46. The scaled difference pixel values S[$\Delta_{ij}$] are further processed by a quantizer select module 48.

Figure 3:
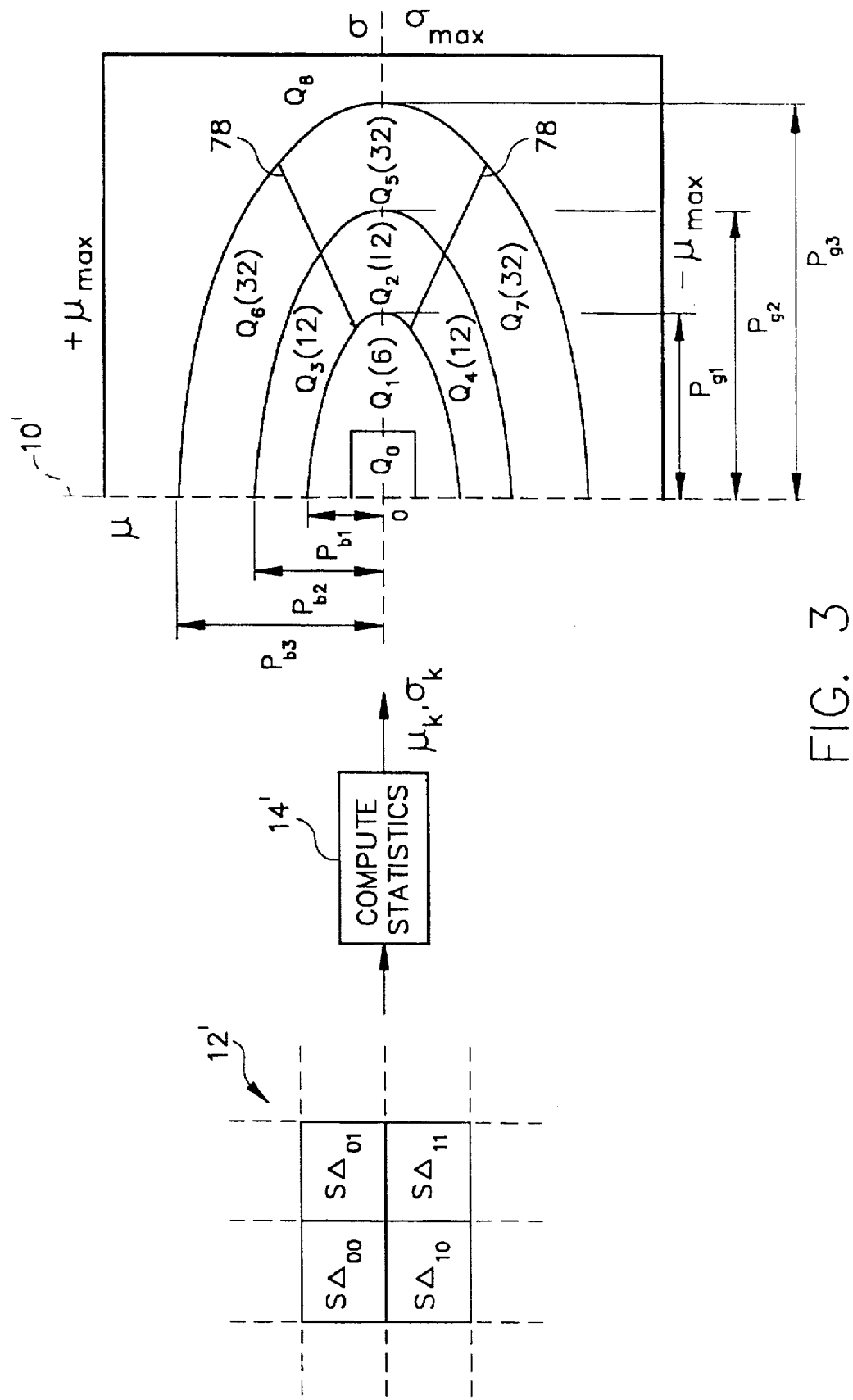
FIG. 3 is a schematic diagram illustrating an elliptically partitioned quantization space employed in the lossy compression path.
Figure 4:
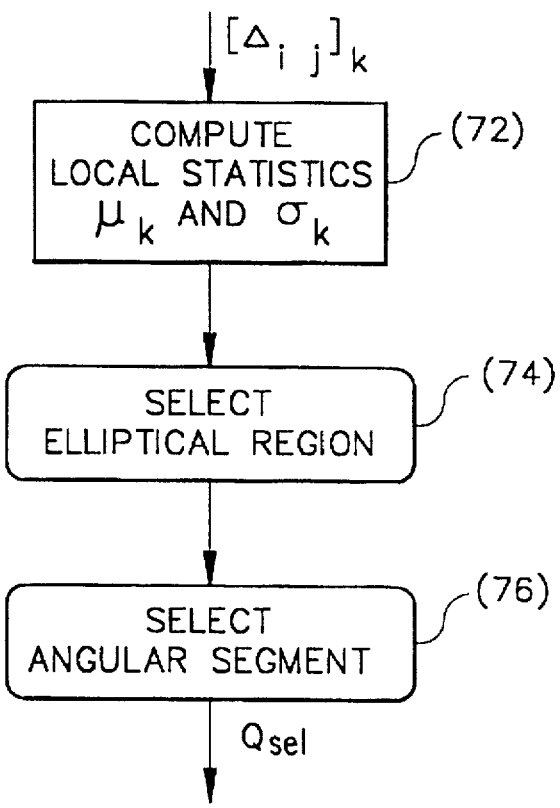
FIG. 4 is a flow chart showing the quantizer selection process employed in the lossy compression path of the present invention.

According to a preferred embodiment of the invention, the multiple quantizers selected by the quantizer select module 48 are arranged in a elliptically partitioned configuration as shown in FIG. 3. Each quantizer $Q_n$ is chosen from a set of quantizers 10' based on the local statistics $\mu_k$, $\sigma_k$ of an n×m blocked neighborhood 12' of scaled residual data S$\Delta_{ij}$, where the subscript k indicates the $k^{th}$ block of residual image data. The mean $\mu_k$ and standard deviation, $\sigma_k$, are computed (14') for each block of scaled data. The absolute value of the mean and standard deviation are clipped to respective maximum values as shown in FIG. 3. These statistics are employed to index a quantizer $Q_n$. The zeroth quantizer $Q_0$ represent a run length quantizer which is selected when the Run_flag is ON. This run length occupies a rectangular portion of the quantizer space as shown in FIG. 3. The remainder of the quantizer space is elliptically and angularly partitioned in the space of the local statistics $\mu$,$\sigma$. Each elliptical segment represents a single quantizer $Q_n$. The number of reconstruction levels for each quantizer is shown in parenthesis next to the quantizer designation in FIG. 3. The quantizer space outside the elliptically partioned region, designated Quantizer $Q_8$, in FIG. 3 represents the lossless compression process. If quantizer $Q_8$ is designated by the quantizer select module 48, switch 26 selects the lossless compression process 18. A specific quantizer $Q_n$ in the elliptically partitioned quantizer space is selected as shown in FIG. 4. First the local statistics $\mu_k$ and $\sigma_k$ are computed (72). Next, the $i^{th}$ elliptical region for each block, indexed by k, is selected (74) if:

$E_i(\mu_k,\sigma_k) \geq 1.0$, and $E_{i+1}(\mu_k,\sigma_k) < 1.0.$ (3)

Where, $E_i$ represents the position of $\mu_k$ and $\sigma_k$ relative to the radii of the $i^{th}$ ellipse $\rho_{bi}$ and $\rho_{gi}$. $E_i$ is computed as follows:

$$E_i(\mu_k, \sigma_k) = \frac{\mu_k^2}{\rho_{bi}^2} + \frac{\sigma_k^2}{\rho_{gi}^2}.$$ (4)

Once the elliptical region is selected, the corresponding angular segment is selected (76) using the following equation:

$$\Phi_k = \text{Tan}^{-1}\left(\frac{\mu_k}{\sigma_k}\right).$$ (5)

Outside the quantizer $Q_0$, the calculated angular position, $\Phi_k$, is compared to the angular segment thresholds 78 (see FIG. 3) to determine the specific quantizer $Q_n$ that will be used for processing the blocked neighborhood of data. In the preferred embodiment, the angular thresholds 78 are ±15 degrees with respect to the horizontal axis $\sigma$.

The elliptical quantizer partitioning provides a more flexible method of categorizing blocked image data than the circularly symmetric quantizer partitioning deployed in the prior art technique. The elliptical partitioning facilitates segmentation of the quantizer space with independent control of both the mean $\mu$ and standard deviation $\sigma$ of the block.

Since the quantizer selection process is operating on scaled block data, the scale factor S discussed above directly affects the quantizer selection process. Scale factors less than one effectively reduce the mean and standard deviation statistics, whereas scale factors greater than one increase these local statistics. This results in a lower $\mu$-$\sigma$ quantizer being selected for scale factors less than one, and a higher $\mu$-$\sigma$ quantizer being selected for scale factors greater than one. Since the innermost quantizers have fewer reconstruction levels, a scale factor below one will reduce the effective bit-rate, whereas a scale factor above one will increase the effective bit-rate.

In conjunction with the above described processing, the original pixel values, previously reconstructed pixel values, and a quantizer select ($Q_{sel}$) signal are fed into a run select module 50 to determine whether the current block of image pixel values are to be classified as a low activity region. The run select module 50 generates a run_flag signal which is ON if the block is classified as low activity image region and is OFF otherwise. The run select module 50 also specifies an image mean tracking signal (DC_track) which is used to track the mean level of an image for blocks that are classified as low activity image blocks. The quantizer select module 48 responds to the scaled difference pixel values S[$\Delta_{ij}$], and the run_flag signal for the block currently being processed and generates the quantizer select signal ($Q_{sel}$). The $Q_{sel}$ signal specifies the specific quantizer used. A run quantizer is selected if the run_flag generated by the run select module 50 is ON. The specific quantizer utilized for quantizing is specified by the quantizer select signal $Q_{sel}$ which is passed to a subsample mask module 52 and a quantizer module 54. The subsample mask module 52 specifies a subsample mask bit pattern for the selected quantizer ($Q_{sel}$) corresponding to the spatial location of pixel values within a block of data.

Figure 5:
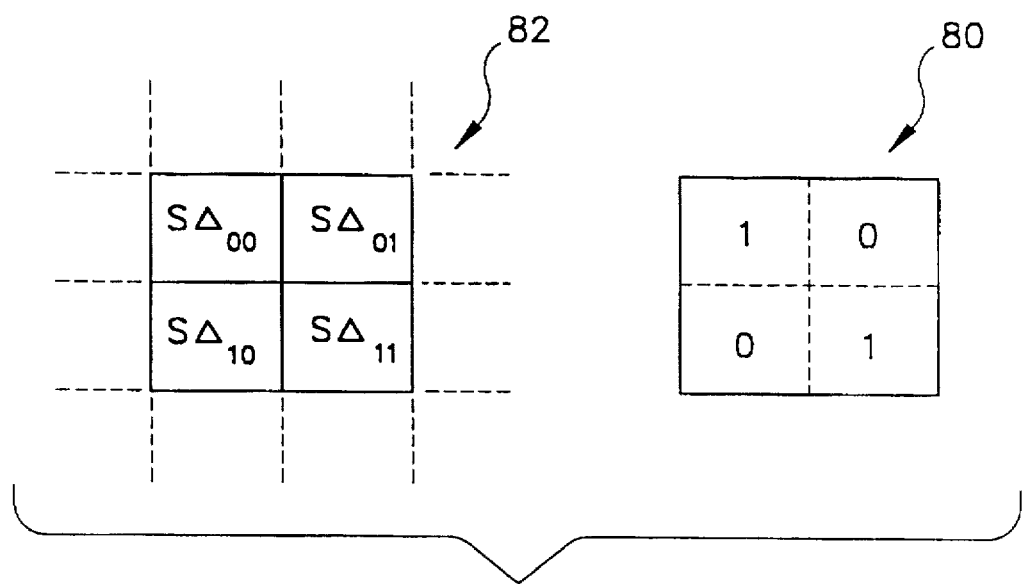
FIG. 5 is a schematic diagram illustrating the block structure and corresponding subsample mask used in the lossy compression path according to one aspect of the present invention.

As shown in FIG. 5, the subsample mask 80 is an n×m (e.g. 2×2) binary bit pattern representing corresponding locations in an n×m block 82 of image scaled image difference pixel values $S\Delta_{ij}$. When the bit pattern value in the subsample mask 80 is a "one", the corresponding scaled image difference pixel value in the block 82 is quantized by quantizer 54 and the quantized symbol $Q_{symbol}$ is transmitted. When the bit pattern value in the subsample mask 80 is a "zero", the corresponding scaled image difference pixel value in the block 82 is set to an average quantization level and no quantized symbol $Q_{symbol}$ is transmitted. In the example of the subsample mask shown in FIG. 5, only half of the quantized scaled image difference pixel values are transmitted by the quantizer 54 via the $Q_{symbol}$ signal. This has the effect of increasing the compression ratio by a factor of two for data blocks quantized with a quantizer having a subsample mask with half the bits set to zero.

Subsample mask bit patterns having zeros are chosen by the system designer for quantizers where there is low activity in the image, such as quantizers $Q_1$ and $Q_2$ where the mean and standard deviation of the image difference pixel values are closer to zero (see FIG. 3). For quantizers representing high activity in the image, all the bits in the subsample mask 80 are set to one. When the quantizer select 48 is selecting a run quantizer (i.e. very low image activity), the bits in the subsample mask 80 are all set to zero.

Quantizer 54 responds to $Q_{sel}$ and subsample mask signals to appropriately quantize scaled difference pixel values $S[\Delta_{ij}]$ (again, not necessarily the same as the difference pixel value produce by subtractors 34 and 44 described above). Quantizer 54 produces both a symbol ($Q_{symbol}$) representing the quantized difference pixel value and the quantized difference pixel value itself ($S[\Delta'_{ij}]$). If the quantization error in the quantized difference pixel value exceeds a predetermined amount, a unique $Q_{symbol}$ is generated by the quantizer 54. $Q_{symbol}$ is fed back to the quantizer select module 48, and when the unique $Q_{symbol}$ is detected by the Quantizer select module 48, it produces an output $Q_{sel}$ representing the lossless process, designated by Q8 in FIG. 3. If a block in a run is targeted for DC tracking, a DC_track symbol in place of the normally transmitted $Q_{symbol}$ is transmitted from the quantizer 54. The $Q_{sel}$ signal and the $Q_{symbol}$ signal comprise the ENC3 encoder command signals discussed with respect to FIG. 1.

The quantized difference pixel value ($S[\Delta'_{ij}]$) is input to an adder 56 along with predicted pixel value $S[p_{ij}]$ to produce a scaled reconstructed pixel value $S[\Gamma_{ij}]$. The scaled reconstructed pixel value $S[\Gamma_{ij}]$ is supplied to a multiplier 58 where it is multiplied by the inverse 1/S of the scale factor to produce blocks of reconstructed pixel values [$\Gamma_{ij}$], which are marked for storage in memory buffer 16. The scaled reconstructed pixel values $S[\Gamma_{ij}]$ are also supplied to a predictor 60. Predictor 60 also receives scaled previously reconstructed pixel values $S[\Gamma_{ij}]$, to produce scaled predicted pixel values $S[P_{ij}]$. The scaled reconstructed pixel values are formed by multiplier 62, which receives previously reconstructed pixel values $\Gamma_{ij}$ and scale factor S.

The scaled predicted pixel values $S[P_{ij}]$ are subtracted from scaled original pixel values $S[I_{ij}]$ in subtractor 64 to produce scaled difference pixel values $S[\Delta_{ij}]$. The scaled original pixel values $S[I_{ij}]$ are formed in a multiplier 66 by multiplying the original pixel values $[I_{ij}]$ by the scale factor S.

Switch 26 receives the configuration control signal CCM, and encoder signals ENC1 and ENC3. Based on the CCM signal switch 26 passes the appropriate encoder signals to encoder 28. Switch 26 also passes the mode signal CCM and the user specified scale factor S to the encoder 28. If the CCM signal is set to select the ENC3 signals and if $Q_{sel}$ indicates quantizer $Q_8$, $Q_{sel}$ is transmitted as overhead, the prefix signal from ENC1 is passed as the Residual, the Code signal from ENC1 is passed as LLCode, and LLflag is turned ON. Switch 26 produces an overhead signal representing either $R_{block}$ or $Q_{sel}$ based on the mode indicated by the CCM signal. Switch 26 also produces a residual signal representing either the prefix symbol from the lossless processor 18 or the $Q_{symbol}$ from the lossy compressor 22. Switch 26 produces a signal LLflag indicating that data being passed to the encoder 28 is from a lossless processor. If the lossless flag LLflag is ON, indicating a lossless process, then the code signals from the lossless processor 18 are passed as LLcode signals to the encoder 28. Switch 26 also enables the memory buffer 16 via enable signal ME to receive marked reconstructed pixel data from the processor or compressor sending encoder signals to the encoder 28 via switch 26.

Encoder 28 receives the encoder command signals from the switch 26, Huffman encodes the overhead and residual signals, and encodes the lossless code LLcode with a fixed bit pattern. The encoder 28 encodes the mode signal CCM and the scale factor S as a fixed bit-length code preceded by a unique marker code. The set of Huffman codes used for encoding the residual signal is chosen based on the overhead signal. The bit length of each LLcode is determined by the residual signal. For blocks of data which are designated as low activity regions, run-length encoding may be used. During a run, the DC tracking bias is encoded using a Huffman code.

When LLflag is ON (i.e. the lossless process is being employed) the range values ($R_{block}$) in the overhead signal are conditionally encoded based on the previous $R_{block}$ values. Table 3 shows the bit lengths of the Huffman codes used to encode these range values. The dashed line at 1-1 in table 3 indicates that this combination of current and previous range values has a high degree of probability and will be run length encoded.

TABLE 3

| Previous $R_{block}$ | Current $R_{block}$ | | | | |
|---|---|---|---|---|---|
| | 0 | 1 | 2 | 3 | 4 |
| 0 | 2 | 1 | 3 | 4 | 4 |
| 1 | 2 | — | 1 | 3 | 3 |
| 2 | 4 | 2 | 1 | 3 | 4 |
| 3 | 4 | 3 | 1 | 2 | 4 |
| 4 | 4 | 4 | 2 | 1 | 3 |

Table 4 shows the bit length of the Huffman code used to encode a prefix value for a selected range value for a block. A blank entry in the table indicates a combination that will not occur.

TABLE 4

| selected $R_{block}$ | Prefix value | | | | | | | | |
|---|---|---|---|---|---|---|---|---|---|
| | 0 | 1 | 2 | 3 | 4 | 5 | 6 | 7 | 8 |
| 0 | 0 | | | | | | | | |
| 1 | 2 | 1 | 2 | | | | | | |
| 2 | 3 | 2 | 2 | 2 | 3 | | | | |
| 3 | 4 | 4 | 3 | 2 | 2 | 2 | | | |
| 4 | 6 | 5 | 4 | 3 | 2 | 2 | 2 | 7 | 7 |

Also, when LLflag is ON, the code values LLcode from the classifier 38 in the lossless processor 18 are encoded using a fixed bit-length code. The length of the code is the same as that shown in the third column of Table 1.

When LLflag is OFF (i.e. the lossy compressor is being employed) the quantizer select values ($Q_{sel}$) in the overhead signal are conditionally encoded based on the previous $Q_{sel}$ values. Table 5 shows the bit lengths of the Huffman codes used to encode these quantizer select values. The dashed line at 0-0 in table 5 below indicates that this combination of current and previous quantizer select values has a high degree of probability and will be run length encoded.

TABLE 5

| Previous $Q_{sel}$ | Current $Q_{sel}$ | | | | | | | | |
|---|---|---|---|---|---|---|---|---|---|
| | 0 | 1 | 2 | 3 | 4 | 5 | 6 | 7 | 8 |
| 0 | — | 1 | 4 | 2 | 3 | 7 | 5 | 6 | 7 |
| 1 | 2 | 1 | 5 | 4 | 3 | 8 | 6 | 7 | 8 |
| 2 | 5 | 2 | 4 | 2 | 2 | 6 | 4 | 4 | 6 |
| 3 | 4 | 2 | 4 | 2 | 2 | 6 | 4 | 5 | 6 |
| 4 | 3 | 2 | 3 | 3 | 2 | 6 | 5 | 4 | 6 |
| 5 | 6 | 4 | 3 | 3 | 2 | 5 | 3 | 2 | 6 |
| 6 | 6 | 3 | 4 | 2 | 2 | 5 | 3 | 3 | 6 |
| 7 | 5 | 2 | 3 | 3 | 2 | 6 | 4 | 3 | 6 |
| 8 | 5 | 4 | 5 | 4 | 3 | 4 | 3 | 2 | 2 |

Table 6 shows the bit length of the Huffman code used to encode a $Q_{symbol}$ value for a selected quantizer select value for a block. A blank entry in the table indicates a combination that will not occur.

When $Q_{sel}$ equals 8, indicating the selection of the lossless processor, the values in table 6 above represent the Huffman code lengths used to encode the prefix value from ENC1 which is sent as the Residual signal.

Although Huffman and run-length coding techniques are presently preferred, other encoding techniques may be employed such as arithmetic coding within the spirit and scope of the present invention. The output of encoder 28 is a bitstream of compressed overhead and image data.

Figure 6:
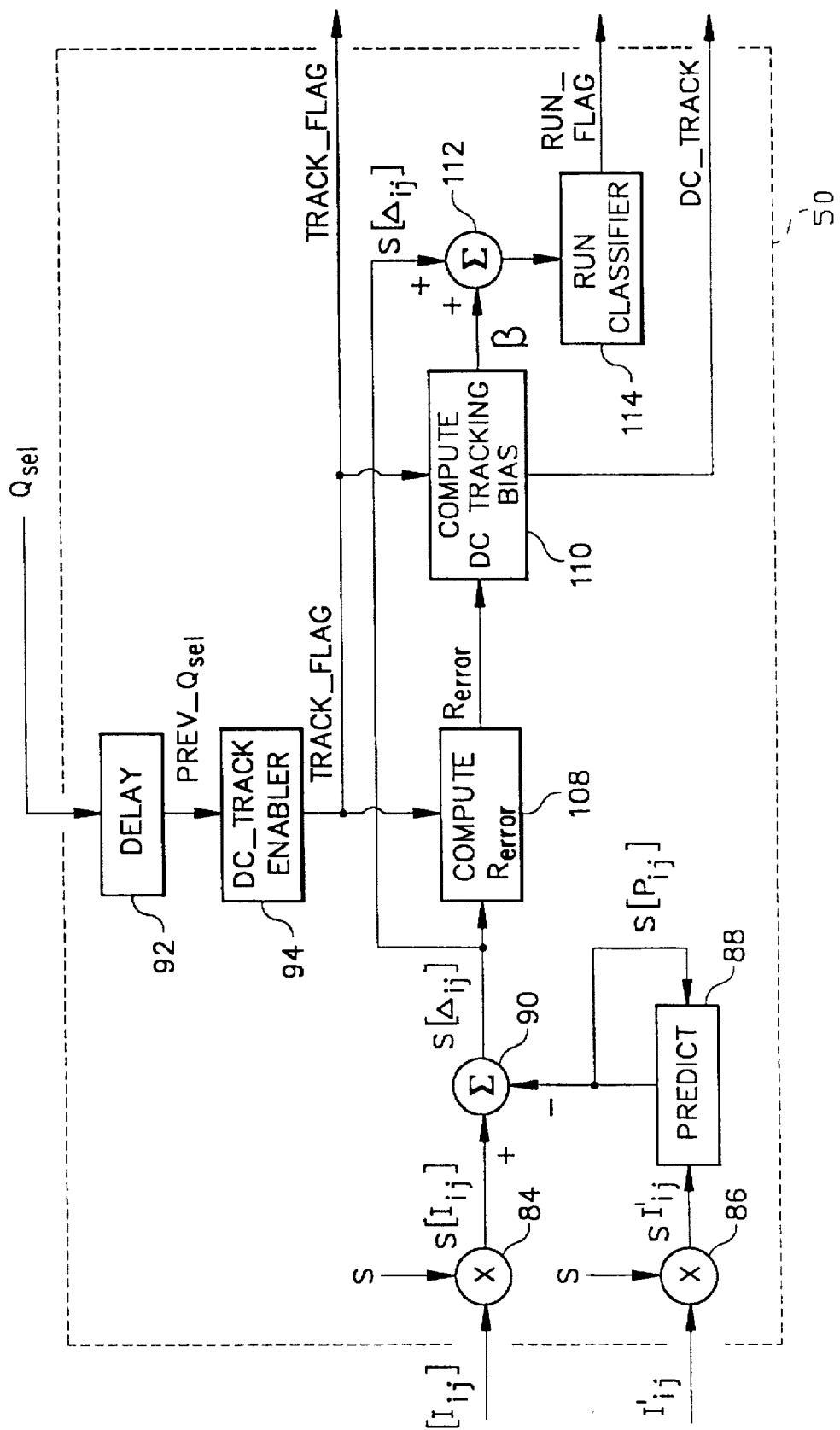
FIG. 6 is a block diagram illustrating the run select and DC tracking module shown in FIG. 2.
Figure 7:
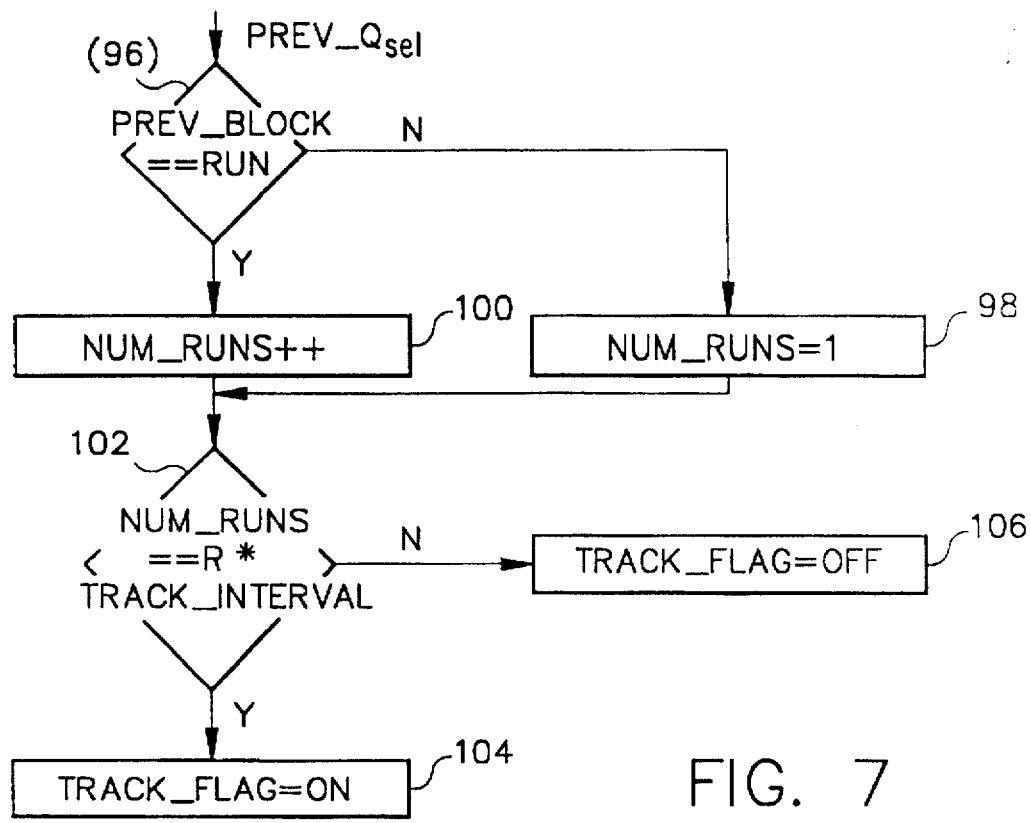
FIG. 7 is a flow chart showing the DC tracking enabling logic performed by the module shown in FIG. 6.

Referring now to FIG. 6, the run select module 50 will be described in further detail. The blocked image pixel values [$I_{ij}$] are multiplied by the scale factor S in multiplier 84 to produce scaled blocked image pixel values $S[I_{ij}]$. Previously reconstructed image pixel values $I'_{ij}$ are multiplied by the scale factor S in multiplier 86 to produce scaled reconstructed image pixel values $ST_{ij}$. The scaled reconstructed image pixel values $ST_{ij}$ are supplied to a predictor 88 which produces blocks of predicted scaled pixel value $S[P_{ij}]$, which are fed back to the predictor 88 and subtracted from the blocks of scaled image pixel values in subtractor 90 on a pixel by pixel basis to form blocks of scaled image difference pixel values $S[\Delta_{ij}]$. The quantizer select signal $Q_{sel}$ is delayed by one block processing period by delay 92 to produce a previous quantizer select signal. The previous quantizer select signal is supplied to a DC track enabler 94. Referring to FIG. 7, the DC track enabler tests to determine whether the previous quantizer select signal indicates a run (96). If the previous quantizer select signal does not indicate a run, an internal counter num_runs that keeps track of the number of blocks in a run is set to one (98). If the previous quantizer select signal indicates a run, the internal counter is incremented by one (100). Next, the internal counter is checked (102) to determine whether the count num_runs is a multiple of a user defined integer (e.g. 4) representing the number of blocks that are passed before checking for a DC track bias. If the count is a multiple of the user defined integer, a DC track flag (track_flag) is turned ON (104), otherwise, the DC track flag is turned OFF (106). Returning to FIG. 6, the DC track flag is supplied to a reconstruction error calculator 108 and a DC track bias calculator 110. The DC track flag is also sent to the quantizer 54. When the DC track flag is ON, the reconstruction error calculator 108 and the DC track bias calculator 110 are enabled. When the DC track flag is OFF, the reconstruction error calculator 108 and the DC track bias calculator 110 are bypassed.

TABLE 6

| Current $Q_{sel}$ | $Q_{symbol}$ | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 0 | 0 | | | | | | | | | | | | | | | |
| 1 | 3 | 3 | 2 | 2 | 3 | 3 | | | | | | | | | | |
| 2 | 7 | 7 | 4 | 3 | 2 | 3 | 3 | 3 | 3 | 3 | 5 | 7 | 7 | | | |
| 4 | 8 | 8 | 5 | 3 | 3 | 2 | 2 | 3 | 4 | 6 | 8 | 8 | | | | |
| 5 | 14 | 12 | 11 | 10 | 9 | 8 | 7 | 6 | 5 | 4 | 4 | 4 | 4 | 4 | 4 | 4 |
| 6 | 14 | 13 | 12 | 10 | 9 | 7 | 6 | 6 | 5 | 5 | 4 | 3 | 3 | 3 | 3 | 3 |
| 7 | 16 | 16 | 16 | 13 | 13 | 11 | 11 | 10 | 9 | 9 | 8 | 7 | 6 | 5 | 4 | 4 |
| 8 | 11 | 10 | 6 | 5 | 4 | 3 | 2 | 2 | 2 | 7 | | | | | | |
| | 16 | 17 | 18 | 19 | 20 | 21 | 22 | 23 | 24 | 25 | 26 | 27 | 28 | 29 | 30 | 31 |
| 0 | | | | | | | | | | | | | | | | |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | 4 | 4 | 4 | 4 | 4 | 4 | 4 | 5 | 6 | 7 | 8 | 9 | 10 | 10 | 13 | 14 |
| 6 | 4 | 4 | 5 | 6 | 6 | 7 | 8 | 8 | 0 | 10 | 10 | 12 | 13 | 13 | 15 | 15 |
| 7 | 3 | 3 | 3 | 3 | 3 | 4 | 4 | 5 | 6 | 7 | 8 | 10 | 11 | 13 | 14 | 16 |
| 8 | | | | | | | | | | | | | | | | |

The reconstruction error calculator 108 receives a block of sampled image pixel difference signals $S[\Delta_{ij}]$ and calculates a reconstruction error $R_{error}$ as follows:

$$R_{error} = \sum_{i=0}^{n-1} \sum_{j=0}^{m-1} S[\Delta_{ij}]. \qquad (6)$$

The DC track bias calculator 110 receives the reconstruction error $R_{error}$ and calculates a bias $\beta$ and a DC_track signal which corresponds to the calculated bias. The bias $\beta$ is determined as follows:

$$\beta = \begin{cases} \beta_0; & R_{error} \leq DC\_Thresh[0] \\ 0; & DC\_Thresh[0] < R_{error} \leq DC\_Thresh[1]. \\ -\beta_0; & DC\_Thresh[1] < R_{error} \end{cases} \qquad (7)$$

where, $\beta_0$ is a positive constant (e.g. 4). DC_Thresh[0] is equal to $-\beta_0/2$; and DC_Thresh[1] is equal to $+\beta_0/2$. In the preferred embodiment described above, $\beta$ can take on any one of three values determined by two thresholds. This concept can be generalized so that $\beta$ can take on any one of any number N of values determined by N–1 thresholds. The DC_track signal is a symbol representing $\beta$, for example, 01 when $\beta$ is 0, 00 when $\beta$ is $-\beta_0$, and 10 when $\beta$ is $+\beta_0$. The DC_track signal is supplied to the quantizer 54 (see FIG. 2). IF the DC track flag is ON, the DC_track signal is transmitted by the quantizer 54 as $Q_{symbol}$ and $\beta$ corresponding to the DC_track signal is passed in place of the quantized difference pixel values $S[\Delta'_{ij}]$.

Figure 8:
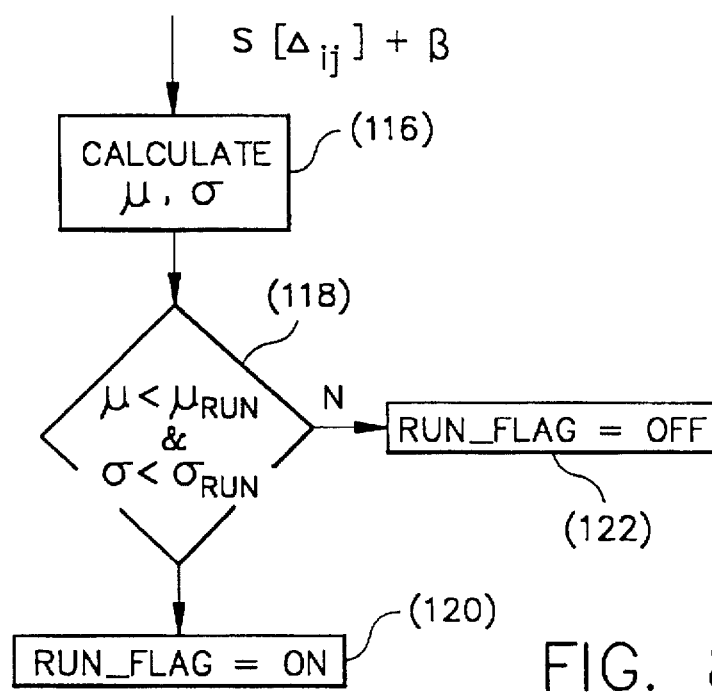
FIG. 8 is a flow chart showing the logic performed by the run classifier shown in FIG. 2.

$\beta$ is added to the scaled difference pixel values $S[\Delta_{ij}]$ in adder 112 to produce biased scaled difference pixel values. The biased scaled difference pixel values are supplied to a run classifier 114. Run classifier 114 determines whether the block should be classified as a run block as shown in FIG. 8. In the classifier 114, the mean and standard deviation of the block of biased scaled difference values is calculated (116). The statistics of the block are then compared to user specified run criteria $\mu_{run}$ and $\sigma_{run}$(118). If the statistics meet the criteria for a run, the run_flag is turned ON (120), otherwise it is turned OFF (122). The run flag is supplied to the quantizer select module 48 (see FIG. 2).

Figure 9:
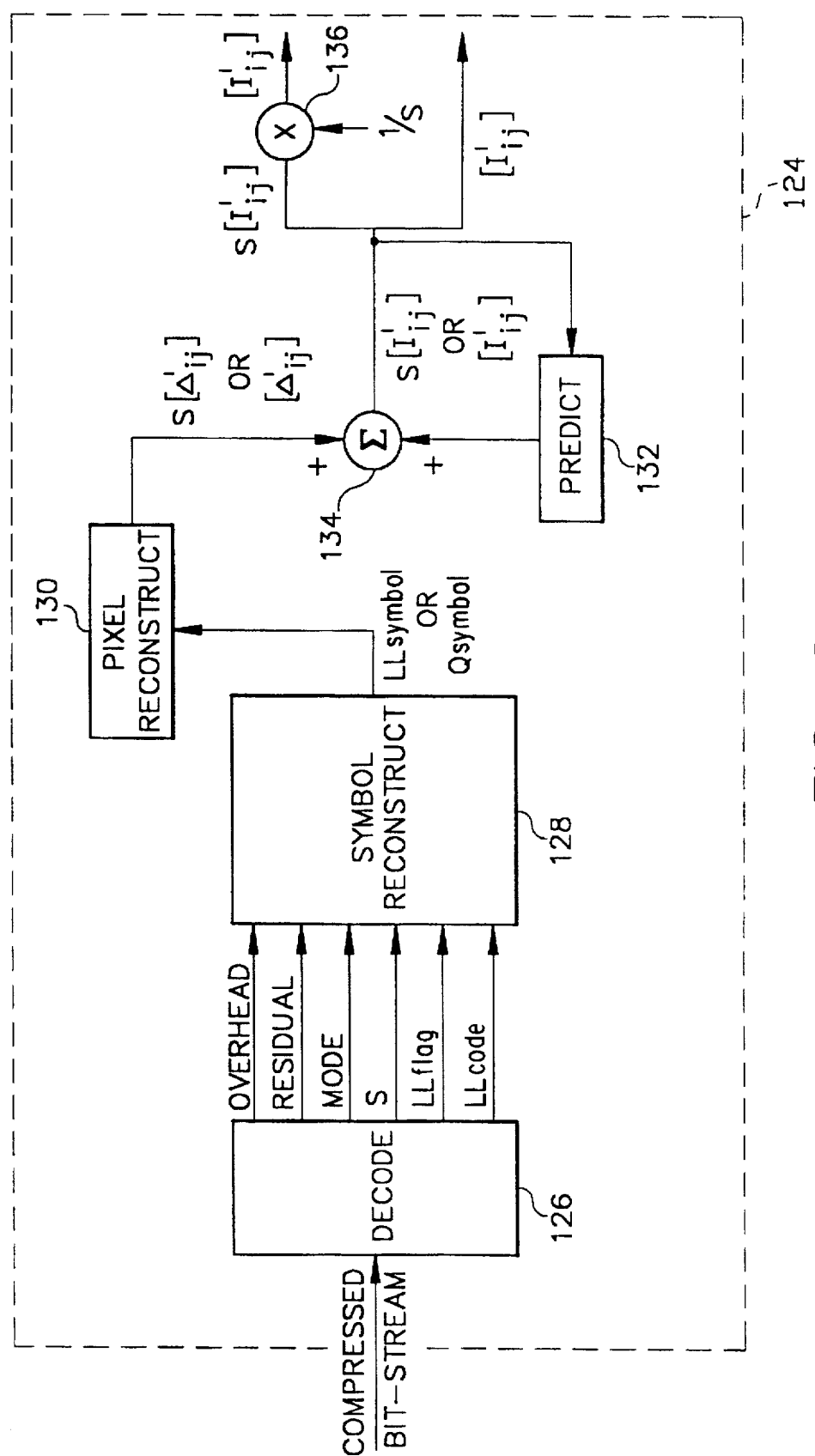
FIG. 9 is a block diagram illustrating a DPCM decompressor according to the present invention.
Figure 10:
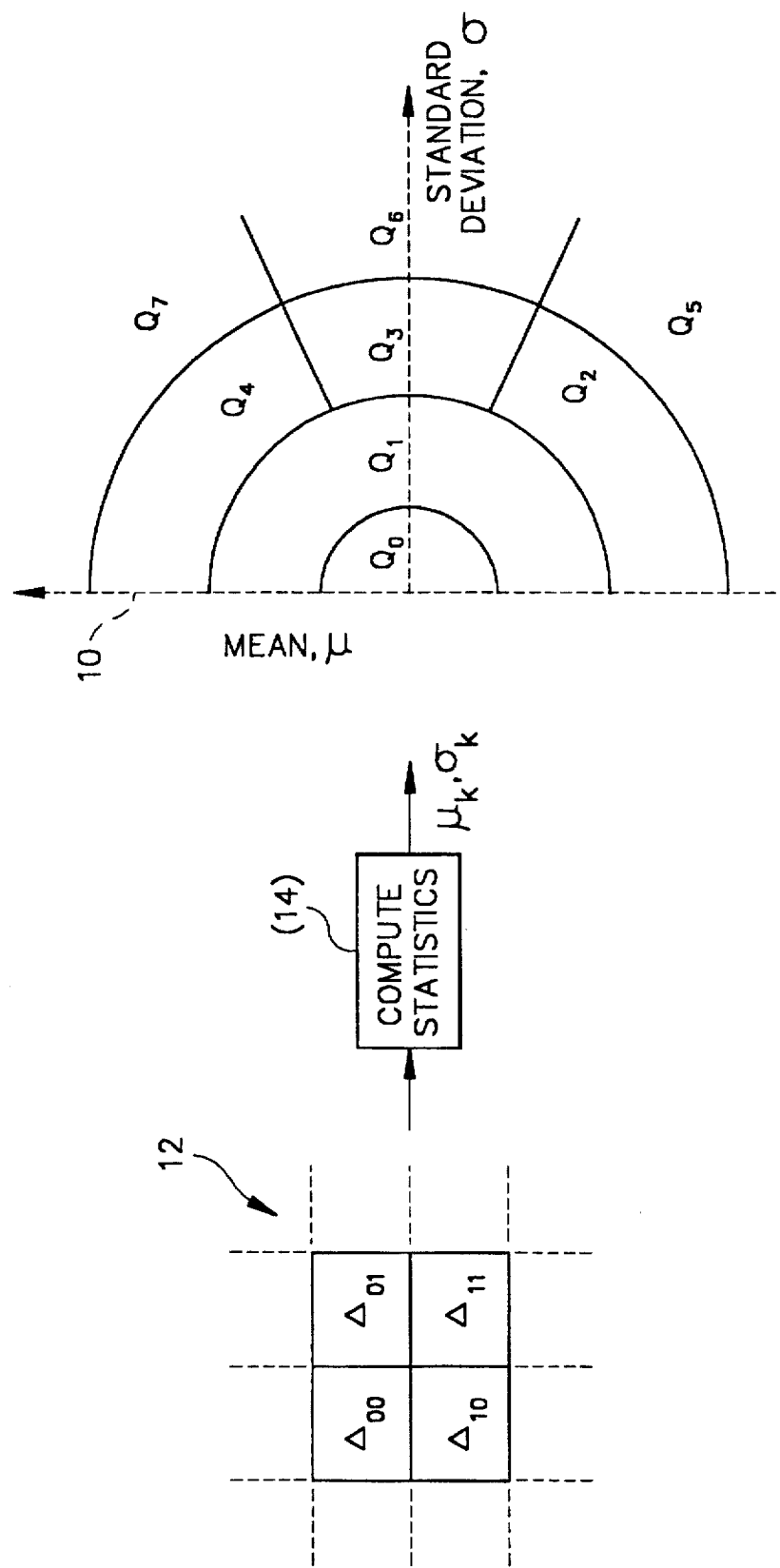
FIG. 10 is a schematic diagram illustrating a circularly partitioned quantization space employed in a lossy compression technique of the prior art.

Referring now to FIG. 9, the decompressor, generally designated 124, for the compressed bit stream will be described. The compressed bit stream is received from storage or transmission and is decoded in a decoder 126 to produce a compression configuration mode signal CCM, a scale factor S, an overhead, residual, LLflag, and LLcode signals by performing the inverse of the encoding technique (e.g. Huffman encoding) implemented by encoder 28. The signals produced by the decoder 126 are supplied to a symbol reconstruct module 128, where either the lossy ($Q_{symbol}$) or lossless ($LL_{symbol}$) symbols are reconstructed depending on the value of the mode signal CCM. To derive the lossless symbol a process that is the inverse of the classifier 38 is performed. The lossy symbol is simply the residual signal 20 provided by the decoder 126. The symbols from the symbol reconstruct module 128 are supplied to a pixel reconstruct module 130, which reconstructs the image difference pixel values $[\Delta_{ij}]$ by performing the inverse process of symbolizer 36 for the lossless symbols. For the lossy symbols, the scaled difference pixel values $S[\Delta'_{ij}]$ are reconstructed by a look up table that is addressed by the symbol value. The reconstructed image difference pixel values are added to predicted image pixel values produced by predictor 132 in adder 134 to produce decompressed image signals $S[\Gamma_{ij}]$ (from lossy compression) or $[\Gamma_{ij}]$ (form lossless compression). The predictor 132 is functionally equivalent to the predictors 32 and 60 in the compressor.

Finally, the decompressed image signal from the lossy compressor are multiplied by the inverse of the scale factor 1/S in multiplier 136.

The block adaptive DPCM compression system described above may be implemented on a general purpose digital computer, or in custom digital processing hardware or firmware. A program written in the C language for operation on Vax VMS and Sun Unix operating systems is included as Appendix A.

The invention has been described with reference to a preferred embodiment. However, it will be appreciated that variations and modifications can be effected by a person of ordinary skill in the art without departing from the scope of the invention. For example, the lossless processor 18 and encoder 28 may be used as a stand alone system for lossless compression. Similarly, lossy compressor 22 and encoder 28 may be used as a stand alone system for lossy compression.

PARTS LIST 10 set of circularly partitioned quantizers
10' set of elliptically partitioned quantizers
12 blocked neighborhood of residual data
12' blocked neighborhood of scaled residual data
(14) compute statistics step
(14') compute statistics step
16 memory buffer
18 first lossless processor
20 second lossless processor
22 first lossy compressor
24 second lossy compressor
26 switch
28 encoder
30 block former
32 predictor
34 subtractor
36 symbolizer
38 classifier
40 range select module
42 predictor
44 subtractor
46 multiplier
48 quantizer select module
50 run select module
52 subsample mask module
54 quantizer module
56 adder
58 multiplier
60 predictor
62 multiplier
64 subtractor
66 multiplier
(72) compute statistics step
(74) select elliptical region step
(76) select angular segments step
78 angular segment thresholds
80 subsample mask
82 block of scaled image difference pixel values
84 multiplier
86 multiplier
88 predictor
90 subtractor
92 delay
94 DC track enabler
(96) test for run step
(98) count step
(100) count step
(102) test for run multiple step (104) turn ON flag step
(106) turn OFF flag step
108 error calculator
110 DC track bias calculator
112 adder
114 run classifier
(116) calculate statistics step
(118) test for run step
(120) turn ON flag step
(122) turn OFF flag step
124 decompressor
126 decoder
128 symbol reconstruct module
130 pixel reconstruct module
132 predictor
134 adder
136 multiplier

We claim:

1. A block adaptive differential pulse code modulation (DPCM) system for transmitting or storing a digital image signal, a compressor for compressing the digital image by operating on n×m blocks of pixel values, comprising:

a. a first numerically lossless DPCM processor responsive to blocks of pixel values for producing encoder command signals;

b. a first lossy DPCM compressor responsive to blocks of pixel values for producing encoder command signals;

c. an encoder for receiving encoder command signals and producing a compressed encoded bit stream;

d. a switch responsive to a compression configuration mode signal and to the encoder command signals from the lossy compressor for selectively passing the encoder command signals from the numerically lossless processor or the lossy compressor to the encoder; and e. a second lossy DPCM compressor employing a different lossy DPCM compression technique than the first lossy DPCM compressor for producing encoder command signals, the switch selectively passing the encoder command signals from the second lossy DPCM compressor to the encoder in response to the compression configuration mode signal.

2. A block adaptive differential pulse code modulation (DPCM) system for transmitting or storing a digital image signal, a compressor for compressing the digital image by operating on n×m blocks of pixel values, comprising:

a. a first numerically lossless DPCM processor responsive to blocks of pixel values for producing encoder command signals;

b. a first lossy DPCM compressor responsive to blocks of pixel values for producing encoder command signals;

c. an encoder for receiving encoder command signals and producing a compressed encoded bit stream;

d. a switch responsive to a compression configuration mode signal and to the encoder command signals from the lossy compressor for selectively passing the encoder command signals from the numerically lossless processor or the lossy compressor to the encoder; and e. a second numerically lossless DPCM processor employing a different numerically lossless DPCM processing technique than the first numerically lossless DPCM processor for producing encoder command signals, the switch selectively passing the encoder command signals from the second numerically lossless DPCM processor to the encoder in response to the compression configuration mode signal.

3. A block adaptive differential pulse code modulation (DPCM) system for transmitting or storing a digital image signal, a compressor for compressing the digital image by operating on n×m blocks of pixel values, comprising:

a. a first numerically lossless DPCM processor responsive to blocks of pixel values for producing encoder command signals;

b. a first lossy DPCM compressor responsive to blocks of pixel values for producing encoder command signals;

c. an encoder for receiving encoder command signals and producing a compressed encoded bit stream;

d. a switch responsive to a compression configuration mode signal and to the encoder command signals from the lossy compressor for selectively passing the encoder command signals from the numerically lossless processor or the lossy compressor to the encoder; and e. wherein the first lossless DPCM processor includes:

i. a predictor for receiving a pixel value and previously reconstructed pixel values and producing a predicted pixel value;

ii. a subtractor for subtracting the predicted pixel value from the pixel value to produce a difference pixel value;

iii. a symbolizer for generating a lossless symbol value corresponding to the difference pixel value;

iv. a classifier for receiving the lossless symbol value and producing corresponding prefix and code signals; and v. a range select module for receiving a block of prefix signals and generating a range value for the block.

4. The block adaptive differential pulse code modulation (DPCM) system claimed in claim 3 wherein:

a. the encoder command signals from the lossless processor include a block of prefix signals identifying a symbol set from a plurality of symbol sets for each location in the block of pixel values, a block of code values identifying a symbol within the identified symbol set for each location within the block of pixel values, and a range select signal specifying the maximum prefix signal within the block of prefix signals;

b. the encoder command signals from the lossy processor include a quantizer select signal for a block of difference pixel values, and a block of symbols respectively representing a block of quantized difference pixels;

c. the switch setting a lossless compression flag when the encoder command signals are being passed from the lossless processor; and d. the encoder produces the compressed encoded bit stream by, when the lossless compression flag is set, using the range select signal to select an encoder table from a plurality of encoder tables, and using the prefix signals and the code values for selecting code bit patterns from the selected table for each location in the block of pixel values and encoding the range select signal as overhead information for each block of pixel values, and when the lossless compression flag is not set, using the quantizer select signal to select an encoder table from a plurality of encoder tables, and using the symbols representing the quantized difference pixels for selecting code bit patterns from the selected table for each location in the block of pixel values, and encoding the quantizer select signal as overhead information.

5. A block adaptive differential pulse code modulation (DPCM) system for transmitting or storing a digital image signal, a compressor for compressing the digital image by operating on n×m blocks of pixel values, comprising:
   a. a first numerically lossless DPCM processor responsive to blocks of pixel values for producing encoder command signals;
   b. a first lossy DPCM compressor responsive to blocks of pixel values for producing encoder command signals;
   c. an encoder for receiving encoder command signals and producing a compressed encoded bit stream;
   d. a switch responsive to a compression configuration mode signal and to the encoder command signals from the lossy compressor for selectively passing the encoder command signals from the numerically lossless processor or the lossy compressor to the encoder; and
   e. wherein the lossy compressor comprises:
      i. a predictor for receiving a pixel value and previously reconstructed pixel values and producing a predicted pixel value;
      ii. a subtractor for subtracting the predicted pixel value from the pixel value to produce a difference pixel value;
      iii. run select means for receiving a block of pixel values, reconstructed pixel values and a quantizer select signal, and producing a DC track signal representing an offset for the block of pixel values, a track flag indicating whether the block of pixel values is to be DC tracked, and a run flag indicating whether the block of pixel values is classified as a run block;
      iv. quantizer select means responsive to difference pixel values, and the run flag, for forming a corresponding block of difference pixel values and for producing the quantizer select signal for the block;
      v. a subsample mask responsive to the quantizer select signal for producing a binary mask;
      vi. a quantizer module responsive to the quantizer select signal, the binary mask, the DC track flag, the DC track signal and a second difference signal for producing quantized difference pixel values for each pixel within the block and corresponding symbol values;
      vii. a second predictor responsive to reconstructed pixel values from a current line and a previous line of pixels to produce a second predicted pixel value;
      viii. means for summing the second predicted pixel value and the corresponding quantized difference pixel value to produce the reconstructed pixel value; and
      ix. means for subtracting the second predicted pixel value from the pixel value to produce the second difference pixel value.

6. The block adaptive differential pulse code modulation (DPCM) system claimed in claim 5, wherein the lossy compressor further comprises:
   a. means for scaling the pixel value, the difference pixel value, the reconstructed pixel values from a previous line, by a scaling factor S that can be varied to control the bit rate of the lossy compressor, whereby the bit rate of the lossy compressor is increased with scale factors greater than one and is decreased with scale factors less than one; and
   b. means for scaling the reconstructed pixel value from a current line by a scaling factor 1/S to produce an unscaled reconstructed pixel value.

7. The block adaptive differential pulse code modulation (DPCM) system claimed in claim 5, wherein the set of quantizers in the quantizer module are elliptically partitioned in quantizer selection space.

8. A block adaptive differential pulse code modulation (DPCM) system for transmitting or storing a digital image signal, a compressor for compressing the digital image by operating on n×m blocks of pixel values, comprising:
   a. a first numerically lossless DPCM processor responsive to blocks of pixel values for producing encoder command signals;
   b. a first lossy DPCM compressor responsive to blocks of pixel values for producing encoder command signals;
   c. an encoder for receiving encoder command signals and producing a compressed encoded bit stream;
   d. a switch responsive to a compression configuration mode signal and to the encoder command signals from the lossy compressor for selectively passing the encoder command signals from the numerically lossless processor or the lossy compressor to the encoder; and
   e. wherein the lossy compressor further comprises means for detecting low activity regions in the digital image signal and for generating an encoder command signal instructing the encoder to employ run length coding for the low activity region.

9. An improved block adaptive differential pulse code modulation (DPCM) system for compressing a digital image signal by operating on n×m blocks of pixel values of the type having a lossy compressor employing a set of quantizers, wherein the improvement comprises: the set of quantizers being elliptically partitioned in quantizer selection space.

10. An improved block adaptive differential pulse code modulation (DPCM) system for compressing a digital image signal by operating on n×m blocks of pixel values of the type having a lossy compressor employing a set of quantizers, wherein the improvement comprises: run select means for detecting a low activity region in the digital image signal, bypassing the set of quantizers when such low activity region is detected and producing a run length signal for the low activity region.

11. The improved block adaptive DPCM claimed in claim 10, wherein the run select means includes:
   a. predictor means responsive to previously reconstructed pixel values and a previous predicted pixel value for producing a predicted pixel value;
   b. a subtractor for subtracting each predicted pixel value from each corresponding pixel value in the block to produce difference pixel values;
   c. means responsive to the track flag and the block of difference pixel values for computing a reconstruction error by calculating the sum of the difference pixel values in the block of difference pixel values;
   d. means for selecting an offset from a set of operator defined offsets in response to the reconstruction error and the track flag;
   e. means for adding the selected offset to the difference pixel values in the block to produce offset difference pixel values and the DC track signal;
   f. means for determining whether a block is classified as a run block in response to the offset difference pixel values; and
   g. means for determining whether a block should be DC tracked based on a quantizer selected for a previous block and producing the track flag that indicates when the block should be DC tracked.

12. An improved block adaptive differential pulse code modulation (DPCM) system for compressing a digital image signal by operating on n×m blocks of pixel values of the type having a lossy compressor employing means for forming a block of difference pixel values, a set of quantizers, means for selecting a quantizer from the set of quantizers for quantizing the difference pixel values within the block, and means for encoding the quantized difference signals, and means for transmitting the encoded quantized difference signals, wherein the improvement comprises:

a. subsample mask means responsive to a quantizer selection for producing a binary mask corresponding to the selected quantizer; and b. means for employing the binary mask to selectively quantize, encode, and transmit the quantized difference pixel value when the corresponding mask value is one and when the corresponding mask value is zero, setting the quantized difference signal to a constant user defined value and transmitting nothing.

13. The block adaptive DPCM system claimed in claim 12, wherein the user defined value is zero.

14. In a block adaptive differential pulse code modulation (DPCM) system for transmitting or storing a digital image signal, a decompressor for reconstructing a digital image from a compressed encoded bit stream produced by a compressor of the type having a first numerically lossless DPCM processor responsive to blocks of pixel values for producing encoder command signals; a first lossy DPCM compressor responsive to blocks of pixel values for producing encoder command signals; an encoder for receiving encoder command signals and producing a compressed encoded bit stream; and a switch responsive to a compression configuration mode signal and to the encoder command signals from the lossy compressor for selectively passing the encoder command signals from the numerically lossless processor or the lossy compressor to the encoder, comprising:

a. a decoder for receiving the compressed encoded bit stream and reproducing the encoder command signals and the compression configuration mode signal; and b. reconstructing means responsive to the reproduced encoder command signals and the compression configuration mode signal for reconstructing the digital image, the reconstructing means including a first means for reconstructing lossless processed digital image data and a second means for reconstructing lossy compressed digital image data.

15. In a block adaptive differential pulse code modulation (DPCM) system, a lossless DPCM processor for compressing a digital image signal having pixel values, comprising:

a. a predictor for receiving a pixel value and previously reconstructed pixel values and producing a predicted pixel value;

b. a subtractor for subtracting the predicted pixel value from the pixel value to produce a difference pixel value;

c. a symbolizer responsive to the predicted pixel value and the corresponding difference pixel value for generating a lossless symbol value corresponding to the difference pixel value;

d. a classifier responsive to the lossless symbol value and producing corresponding prefix and code signals;

e. a range select module for receiving a block of prefix signals and generating a range value for the block; and f. an encoder responsive to the prefix, code and range values for producing a compressed bit stream representing the digital image.

16. The lossless processor claimed in claim 15, wherein said encoder includes a Huffman encoder.

17. The lossy DPCM compressor claimed in claim 16, further comprising:

a. means for detecting low activity regions in the digital image signal; and b. means for generating an encoder command signal instructing the encoder to employ run length coding for the low activity region.

18. The lossy DPCM system claimed in claim 17, wherein the set of quantizers in the quantizer module are elliptically partitioned in quantizer selection space.

19. In a block adaptive differential pulse code modulation (DPCM) system, a lossy DPCM compressor for compressing a digital image signal having pixel values, comprising:

a. a predictor for receiving a pixel value and previously reconstructed pixel values and producing a predicted pixel value;

b. a subtractor for subtracting the predicted pixel value from the pixel value to produce a difference pixel value;

c. run select means for receiving a block of pixel values, reconstructed pixel values and a quantizer select signal, and producing a DC track signal representing an offset for the block of pixel values, a track flag indicating whether the block of pixel values is to be DC tracked, and a run flag indicating whether the block of pixel values is classified as a run block;

d. quantizer select means responsive to difference pixel values, and the run flag, for forming a corresponding block of difference pixel values and for producing the quantizer select signal for the block;

e. a subsample mask responsive to the quantizer select signal for producing a binary mask;

f. a quantizer module responsive to the quantizer select signal, the binary mask, the DC track flag, the DC track signal and a second difference signal for producing quantized difference pixel values for each pixel within the block and corresponding symbol values;

g. a second predictor responsive to reconstructed pixel values from a current line and a previous line of pixels to produce a second predicted pixel value;

h. means for summing the second predicted pixel value and the corresponding quantized difference pixel value to produce the reconstructed pixel value;

i. means for subtracting the second predicted pixel value from the pixel value to produce the second difference pixel value; and j. an encoder responsive to the quantizer select signal and the symbol value corresponding to the quantized difference pixel value for producing a compressed bit steam representing the digital image.

20. The lossy DPCM compressor claimed in claim 19, further comprising:

a. means for scaling the pixel value, the difference pixel value, and the reconstructed pixel values from a previous line, by a scaling factor S that can be varied to control the bit rate of the lossy compressor, whereby the bit rate of the lossy compressor is increased with scale factors greater than one and is decreased with scale factors less than one; and b. means for scaling the reconstructed pixel value from a current line by a scaling factor 1/S to produce an unscaled reconstructed pixel value.

21. The lossy DPCM compressor claimed in claim 19, wherein the run select means includes:

a. predictor means responsive to previously reconstructed pixel values and a previous predicted pixel value for producing a predicted pixel value;

b. a subtractor for subtracting each predicted pixel value from each corresponding pixel value in the block to produce difference pixel values;

c. means responsive to the track flag and the block of difference pixel values for computing a reconstruction error by calculating the sum of the difference pixel values in the block of difference pixel values;

d. means for selecting an offset from a set of operator defined offsets in response to the reconstruction error and the track flag;

e. means for adding the selected offset to the difference pixel values in the block to produce offset difference pixel values and the DC track signal;

f. means for determining whether a block is classified as a run block in response to the offset difference pixel values; and g. means for determining whether a block should be DC tracked based on a quantizer selected for a previous block and producing the track flag that indicates when the block should be DC tracked.

22. The lossy DPCM compressor claimed in claim 19, wherein the run select means includes:

a. subsample mask means responsive to a quantizer selection for producing a binary mask corresponding to the selected quantizer; and b. means for employing the binary mask to selectively quantize, encode, and transmit the quantized difference pixel value when the corresponding mask value is one and when the corresponding mask value is zero, setting the quantized difference signal to a constant user defined value and transmitting nothing.

23. The block adaptive DPCM system claimed in claim 22, wherein the user defined value is zero.

* * * * *